Patented June 17, 1947

2,422,486

UNITED STATES PATENT OFFICE 2,422,486

EMULSIFYING AND WHIPPING AGENTS

Norman F. Johnston, Norwalk, Conn., assignor to R. T. Vanderbilt Company, Inc., New York, N. Y., a corporation of New York No Drawing. Application May 24, 1945, Serial No. 595,663

4 Claims. (Cl. 252—308)

My invention is an improved composition which has several important advantages as an emulsifying agent and as a whipping agent in the preparation of food products. It is, for example, useful in ice cream, salad dressings, margarine, frozen foods, cakes, icings and fillings, chocolate and fondants. Broadly stated, the composition of my invention consists essentially of a mixture, in the form of an emulsion in water, of two polyoxyalkalene derivatives of partial long chain fatty acid esters of anhydrides of hexahydric alcohols differing in their combined polyoxyalkalene content and, therefore, in their relative solubility in water.

The mono stearates of sorbitan, mannitan and dulcitan and their preparation have been described, see for example United States Patent No. 2,322,820. Partial esters comprising ethylene oxide condensation products and their preparation have been described, see for example United States Patent No. 1,959,930. And the solubilizing of a variety of compounds relatively insoluble in water by condensation with ethylene oxide has been described, see for example United States Patent No. 1,970,578.

If a series of condensation products of sorbitan mono stearate for example with increasing proportions of ethylene oxide are prepared, it will be found that those in which the molar ratio of sorbitan mono stearate to ethylene oxide is high, that is above about 1:10, are relatively insoluble in water but that these condensation products become relatively soluble in water as this molar ratio decreases and that those in which this molar ratio is low, that is below about 1:15, are relatively soluble in water. All of the series, down to a molar ratio of sorbitan mono stearate to ethylene oxide of about 1:50 will be compatible with oleaginous material, fats and oils.

I have discovered that a mixture of two such condensation products, one relatively insoluble in water and the other relatively soluble in water, have the capacity to produce both oil-in-water emulsions and water-in-oil emulsions and have unusual values, unique in some instances, in food products.

In a particularly advantageous form the composition of my invention consists essentially of about 24 parts by weight of a condensation product of sorbitan mono stearate and ethylene oxide in molar ratio of about 1:4 and about 6 parts by weight of a condensation product of sorbitan mono stearate and ethylene oxide in molar ratio of about 1:20 emulsified in water. The composition may include about 15% by volume on the emulsion of dispersed air. The composition may also include a preservative, 0.2% by weight of benzoic acid, for example.

The proportion of the condensation product relatively insoluble in water may be varied from about 27 parts to about 15 parts and the proportion of the condensation product relatively soluble in water may vary from about 3 parts to about 15 parts for a total of 30 parts of the combined condensation products. However, the maximum permissible proportion of the condensation product relatively soluble in water decreases as the ethylene oxide content of the condensation product relatively insoluble in water increases. Thus, for example, if the mono stearate:ethylene oxide molar ratio of the relatively insoluble product is about 1:6, as much as 15 parts out of a total of 30 parts of the relatively soluble product may be included in the composition. However, if the mono stearate:ethylene oxide molar ratio of the relatively insoluble product is about 1:10, not more than about 10 parts of the relatively soluble product out of a total of 30 parts should be included in the composition. The mono stearate:ethylene oxide molar ratio of the condensation product relatively insoluble in water may be between about 1:2 and 1:10. The mono stearate:ethylene oxide molar ratio of the condensation product relatively soluble in water may be between about 1:15 and 1:50.

While sorbitan mono stearate is a particularly advantageous mono stearate, mannitan mono stearate and dulcitan mono stearate or mixtures of two or three of these mono stearates may with advantage be condensed with ethylene oxide to form the condensation products included in my composition.

In compositions containing a total of 30 parts by weight of the diverse condensation products, I have found 70 parts of water to be an advantageous proportion. The precise proportion of water in the composition, however, is not critical. The usefulness of the water in activating the condensation products can be described by analogy with soap which in the anhydrous form is incapable of readily forming a good lather but containing, say 30% water readily lathers. There is good reason to believe that these condensation products form different phases depending on the proportion of water present and the mechanical history of the combination, just as soap containing 12% water that has been milled is in one phase and differs in its lathering ability from a soap containing 30% water that has been framed and exists in another phase.

A condensation product of sorbitan mono stearate and ethylene oxide with a molar ratio of about 1:4 is currently available commercially under the trade name Tween 61 and a condensation product of sorbitan mono stearate and ethylene oxide with a molar ratio of about 1:20 is currently available commercially under the trade name Tween 60. In my composition, for use in food products, both condensation products must of course be of high purity.

The following example will illustrate the best method now known to me for compounding my composition: The apparatus required comprises an insulated hot room, three steam jacketed kettles, an emulsifying mixer with means for temperature control, and appropriate packaging equipment. Those parts of the apparatus coming in contact with the product are preferably fabricated of stainless steel. I have found the apparatus currently marketed under the trade name Votator satisfactory as an emulsifying mixer. The condensation product of sorbitan mono stearate with ethylene oxide in molar ratio of 1:4 has a melting point approximating 110° F. and resembles a fat in appearance. It is relatively insoluble in water but soluble in oil. The condensation product of sorbitan mono stearate with ethylene oxide in molar ratio of 1:20 has a melting point approximating 75° F. and resembles a fat in appearance. It is soluble in water and in oil. Both of these materials are placed, for example, in the shipping containers in which they are received, in the hot room and are held there until they have melted and have reached a fairly uniform temperature approximating 120° F. The melted mono stearates are then separately charged into two of the jacketed kettles where they are each maintained at a temperature of about 120° F. Benzoic acid is dissolved in water in the third jacketed kettle in proportion sufficient to provide the desired concentration of benzoic acid in the final product, say 0.2%, and this dilute aqueous solution of benzoic acid is also maintained at a temperature of about 120° F. The two mono stearates and the aqueous solution of benzoic acid are pumped from the three kettles through the emulsifying mixer at rates regulated to produce a mixture, leaving the mixer, containing 24% by weight of the first mentioned mono stearate, 6% of the second mentioned mono stearate and 70% of the aqueous solution of benzoic acid. 15% by volume of air is also incorporated in the mixture as it passes through the emulsifying mixer. The mixture is cooled to a temperature approximating 90° F. as it passes through the emulsifying mixer. The product discharged from the mixer is packaged in paraffin lined fiber drums. After standing for about two or three hours, it has a consistency greater than that of unwhipped cream and less than that of hydrogenated shortening.

This product, an advantageous embodiment of the composition of my invention, is generally useful as an emulsifying agent and as a whipping agent in food products. In general it is useful in proportions, on the emulsified food product, of about 1% or 2% by weight.

My composition has unique properites in cake batters, and in such formulation is not to be regarded as a substitute for other materials previously used. Fundamentally, a cake batter must contain at least sufficient shortening to develop proper eating and keeping qualities. If the shortening contributes to flavor and aroma, additional quantities may be added to improve the batter in these respects, but hydrogenated vegetable oil shortenings, although perhaps superior to butter and lard in creaming properties, do not enrich a cake batter in the sense that butter and lard do. Cake batter may also be enriched, in terms of flavor and aroma, by the addition of eggs. However, as the egg content of the batter is increased the cake becomes tougher and less tender unless some tenderizing agent is also added in corresponding proportion. Shortenings have this tenderizing effect, but increases of shortening which contribute nothing to flavor and aroma, but rather tend to cover and reduce the desired flavors, such as that imparted by the eggs, are unsatisfactory if carried very far and are uneconomical in any event. My composition, however, is an effective creaming and tenderizing agent and consequently can be used in proportions much smaller than the additional quantity of shortening otherwise required, in batters rich in egg material, to produce a satisfactory cake. Also, the use of my composition seems to enhance the egg flavor imparted to the batter by enrichment with eggs.

Because of its efficacy as an emulsifying agent and as a whipping agent, my composition also can be used to realize savings in processing time and labor as well as to improve the quality of the cake, particularly in sponge cake and in angel food cake. With the composition of my invention, shortening may be used only to the extent necessary to produce cake of proper eating and keeping qualities, further additions of shortening to yield desired creaming or aeration of the batter being unnecessary, these functions being better served by relatively small additions of my composition. Additions of my composition in proportions of about 1.5% by weight on the cake batter will illustrate the utility and advantages of my invention in this application.

With small additions of my composition, the creaming properties of butter and lard can be improved to equal or surpass creaming properties of hydrogenated vegetable oil shortening.

I claim:

1. A composition consisting essentially of about 24 parts by weight of a condensation product of sorbitan mono stearate and ethylene oxide in molar ratio of about 1:4 and about 6 parts by weight of a condensation product of sorbitan mono stearate and ethylene oxide in molar ratio of about 1:20 emulsified in water.

2. A composition consisting essentially of about 27–15 parts by weight of a condensation product of sorbitan mono stearate and ethylene oxide in molar ratio between about 1:2 and 1:6 and about 3–15 parts by weight of a condensation product of sorbitan mono stearate and ethylene oxide in molar ratio between about 1:15 and 1:50 for a total of 30 parts of the combined condensation products emulsified in water.

3. A composition consisting essentially of about 27–20 parts by weight of a condensation product of sorbitan mono stearate and ethylene oxide in molar ratio between about 1:2 and 1:10 and about 3–10 parts by weight of a condensation product of sorbitan mono stearate and ethylene oxide in molar ratio between about 1:15 and 1:50 for a total of 30 parts of the combined condensation products emulsified in water.

4. A composition consisting essentially of about 27–15 parts by weight of a condensation product of a mono stearate of the class consisting of sorbitan, mannitan and dulcitan and mixtures thereof and ethylene oxide in molar ratio between about 1:2 and 1:6 and about 3–15 parts by weight of a condensation product of a monostearate of the class consisting of sorbitan, mannitan and dulcitan and mixtures thereof and ethylene oxide in molar ratio between about 1:15 and 1:50 for a total of 30 parts of the combined condensation products emulsified in water.

NORMAN F. JOHNSTON.

REFERENCES CITED

The following references are of record in the file of this patent:

UNITED STATES PATENTS

| Number | Name | Date |
|---|---|---|
| 2,146,026 | Power | Feb. 7, 1939 |
| 2,318,920 | Brown | May 11, 1943 |
| 1,928,582 | Wecker | Sept. 26, 1933 |
| 2,052,025 | Harris | Aug. 25, 1936 |

FOREIGN PATENTS

| Number | Country | Date |
|---|---|---|
| 573,048 | Germany | Mar. 27, 1933 |
| 590,165 | Germany | Dec. 27, 1933 |

OTHER REFERENCES

"Atlas Spans and Tweens," Atlas Powder Co., Industrial Chemical Dept., Wilmington, Del. (1942), back of front page and pages 1, 2, 3, 4, 7, 8, and 9.